United States Patent
Riou

(10) Patent No.: US 10,341,085 B2
(45) Date of Patent: Jul. 2, 2019

(54) SOFTWARE PROTECTION AGAINST DIFFERENTIAL FAULT ANALYSIS

(71) Applicant: NXP B.V., Eindhoven (NL)

(72) Inventor: Sebastien Riou, Hamburg (DE)

(73) Assignee: NXP B.V., Eindhoven (NL)

( * ) Notice: Subject to any disclaimer, the term of this patent is extended or adjusted under 35 U.S.C. 154(b) by 171 days.

(21) Appl. No.: 15/257,822

(22) Filed: Sep. 6, 2016

(65) Prior Publication Data

US 2018/0069694 A1    Mar. 8, 2018

(51) Int. Cl.
| | |
|---|---|
| *H04L 29/00* | (2006.01) |
| *H04L 9/00* | (2006.01) |
| *G06F 21/14* | (2013.01) |
| *H04L 9/06* | (2006.01) |

(52) U.S. Cl.
CPC .............. *H04L 9/004* (2013.01); *G06F 21/14* (2013.01); *H04L 9/0631* (2013.01); *H04L 9/003* (2013.01); *H04L 9/005* (2013.01); *H04L 9/0618* (2013.01); *H04L 2209/046* (2013.01); *H04L 2209/12* (2013.01); *H04L 2209/125* (2013.01)

(58) Field of Classification Search
CPC . H04L 9/0637; H04L 9/3236; H04L 2209/24; H04L 2209/20; H04L 63/123
See application file for complete search history.

(56) References Cited

U.S. PATENT DOCUMENTS

| | | | | |
|---|---|---|---|---|
| 2003/0202658 | A1* | 10/2003 | Verbauwhede | ....... H04L 9/0631 380/43 |
| 2007/0014395 | A1* | 1/2007 | Joshi | ....... H04L 9/004 380/28 |
| 2010/0306553 | A1* | 12/2010 | Poletti, III | ....... G06F 7/00 713/189 |

OTHER PUBLICATIONS

Matsui, M. et al. "On the Power of Bitslice Implementation on Intel Core2 Processor", International Workshop on Cryptographic Hardware and Embedded Systems, CHES 2007, Springer-Verlag, pp. 121-134 (2007).
Riou, S. "GitHub—sebastien-riou/masked-bit-sliced-aes-218:masked, bit-sliced AES-128 demo code", 3 pgs., retrieved from the internet Jan. 19, 2018 at: https://github.com/sebastien-riou/masked-bit-sliced-aes-128(Jul. 17, 2016)_.
Patrick, C. et al. "Lightweight Fault Attack Resistance in Software Using Intra-Instruction Redundancy", International Association for Cryptologic Research, vol. 20160907:141643, pp. 1-14 (Sep. 3, 20160).
Extended European Search Report for Patent Appln. No. 17188390.3 (dated Jan. 29, 2018).
Kaijie Wu et al.; "Concurrent Error Detection of Fault-Based Side-Channel Cryptanalysis of 128-Bit RC6 Block Cipher"; IEEE Transactions on Computer-Aided Design of Integrated Circuits and Systems, 21(12):1509-1517, Dec. 2002.

(Continued)

Primary Examiner — Ghazal B Shehni

(57) ABSTRACT

An encryption module and method for performing an encryption/decryption process executes two cryptographic operations in parallel in multiple stages. The two cryptographic operations are executed such that different rounds of the two cryptographic operations are performed in parallel by the same instruction or the same finite state machine (FSM) state for hardware implementation.

20 Claims, 4 Drawing Sheets

(56) References Cited

OTHER PUBLICATIONS

Marcel Medwed; "A Continuous Fault Countermeasure for AES Providing a Constant Error Detection Rate", Cryptology ePrint Archive, Report 2009/119 (2009) http://eprint.iacr.org/2009/119.pdf.

Alessandro Barenghi et al.; "Countermeasures Against Fault Attacks on Software Implemented AES: Effectiveness and Cost"; WESS '10 Proceedings of the 5th Workshop on Embedded Systems Security Article No. 7; 2010.

Harshal Tupsamudre et al.; "Destroying Fault Invariant with Randomization, A Countermeasure for AES against Differential Fault Attacks"; CHES 2014 vol. 8731 of the series Lecture Notes in Computer Science pp. 93-111, Cryptographic Hardware and Embedded Systems—CHES 2014 vol. 8731 of the series Lecture Notes in Computer Science pp. 93-111; Sep. 24, 2014.

M. Tunstall, D. Mukhopadhyay, and S. Ali, "Differential Fault Analysis of the Advanced Encryption Standard using a Single Fault," In Proc. of the 5th IFIP WG 11.2 International Workshop on Information Security Theory and Practice. Security and Privacy of Mobile Devices in Wireless Communication (WISTP'11), Crete, Greece, LNCS, vol. 6633, pp. 224-233. Springer-Verlag, Jun. 2011.

Eli Biham, "A Fast New DES Implementation in Software," FSE '97 Proceedings of the 4th International Workshop on last Software Encryption, pp. 260-272 (1997).

D. Boneh, R. DeMillo, and R. Lipton, "On the Importance of Checking Cryptographic Protocols for Faults," In W. Fumy, editor, Advances in Cryptology—Eurocrypt '97, vol. 1233 of Lecture Notes in Computer Science, pp. 37-51, Springer-Verlag, 1997.

\* cited by examiner

SOFTWARE PROTECTION AGAINST DIFFERENTIAL FAULT ANALYSIS

Embodiments of the invention relate generally to embedded systems and, more particularly, to embedded systems with cryptographic capabilities.

Embedded systems, such as smart cards, electronic passports, internet of things (IoT) devices and smart meters, may include cryptographic capabilities to encrypt and/or decrypt sensitive data, such as private keys for authentication. These cryptographic capabilities may be provided by a cryptographic algorithm, such as Data Encryption Standard (DES) or Advanced Encryption Standard (AES) algorithm.

However, an embedded system performing a cryptographic algorithm such as an AES algorithm may be attacked using a differential fault analysis (DFA) method. This attack method is particularly dangerous, since in some cases, it allows for full recovery of the sensitive data, such as a secret key, from the observation of a single faulty output. Implementing a protective measure from such attacks is a challenging task due to the very nature of cryptographic algorithm (e.g., high non-linearity and high diffusion). Conventional countermeasures against such attacks typically multiply the runtime by a factor of two (2) or more and do not provide sufficient protection against attacks on execution flows.

An encryption module and method for performing an encryption/decryption process executes two cryptographic operations in parallel in multiple stages. The two cryptographic operations are executed such that different rounds of the cryptographic operations are performed in parallel by the same instruction or the same finite state machine (FSM) state for hardware implementation.

In an embodiment, a method for performing an encryption/decryption process comprises executing multiple rounds of a first cryptographic operation of the encryption/decryption process on a first block of input data in multiple stages, and executing multiple rounds of a second cryptographic operation of the encryption/decryption process on a second block of input data in the multiple stages, wherein the first cryptographic operation on the first block of input data is performed in parallel with the second cryptographic operation on the second block of input data such that different rounds of the first and second cryptographic operations are performed in parallel by one of the same instruction and the same finite state machine (FSM) state.

In an embodiment, the first cryptographic operation on the first block of input data is performed in parallel with the second cryptographic operation on the second block of input data such that i round of the first cryptographic operation and i−1 round of the second cryptographic operation are performed during at least one of the multiple stages.

In an embodiment, the first cryptographic operation on the first block of input data is performed in parallel with the second cryptographic operation on the second block of input data such that a first round of the first cryptographic operation and none of the rounds of the second cryptographic operation are performed during a first stage of the multiple stages.

In an embodiment, the first cryptographic operation on the first block of input data is performed in parallel with the second cryptographic operation on the second block of input data such that none of the rounds of the first cryptographic operation and the last round of the second cryptographic operation are performed during a final stage of the multiple stages.

In an embodiment, the first and second blocks of input data are sixteen (16) bits.

In an embodiment, the first and second blocks of input data are eight (8) bits.

In an embodiment, wherein each of the first and second cryptographic operations includes ten (10) rounds.

In an embodiment, a computer-readable storage medium containing program instructions for performing an encryption/decryption process, wherein execution of the program instructions by one or more processors of a computer system causes the one or more processors to perform steps comprising executing multiple rounds of a first cryptographic operation of the encryption/decryption process on a first block of input data in multiple stages, and executing multiple rounds of a second cryptographic operation of the encryption/decryption process on a second block of input data in the multiple stages, wherein the first cryptographic operation on the first block of input data is performed in parallel with the second cryptographic operation on the second block of input data such that different rounds of the first and second cryptographic operations are performed in parallel by one of the same instruction and the same finite state machine (FSM) state.

In an embodiment, the first cryptographic operation on the first block of input data is performed in parallel with the second cryptographic operation on the second block of input data such that i round of the first cryptographic operation and i−1 round of the second cryptographic operation are performed during at least one of the multiple stages.

In an embodiment, the first cryptographic operation on the first block of input data is performed in parallel with the second cryptographic operation on the second block of input data such that a first round of the first cryptographic operation and none of the rounds of the second cryptographic operation are performed during a first stage of the multiple stages.

In an embodiment, the first cryptographic operation on the first block of input data is performed in parallel with the second cryptographic operation on the second block of input data such that none of the rounds of the first cryptographic operation and the last round of the second cryptographic operation are performed during a final stage of the multiple stages.

In an embodiment, the first and second blocks of input data are sixteen (16) bits.

In an embodiment, the first and second blocks of input data are eight (8) bits.

In an embodiment, each of the first and second cryptographic operations includes ten (10) rounds.

In an embodiment, an encryption module comprises memory, a register, a finite state machine, and an arithmetic logic unit, wherein the arithmetic logic unit is configured to execute multiple rounds of a first cryptographic operation of the encryption/decryption process on a first block of input data in multiple stages and execute multiple rounds of a second cryptographic operation of the encryption/decryption process on a second block of input data in the multiple stages, and wherein the arithmetic logic unit is further configured so that the first cryptographic operation on the first block of input data is performed in parallel with the second cryptographic operation on the second block of input data such that different rounds of the first and second cryptographic operations are performed in parallel by one of the same instruction and the same finite state machine (FSM) state.

In an embodiment, the arithmetic logic unit is configured so that the first cryptographic operation on the first block of input data is performed in parallel with the second cryptographic operation on the second block of input data such that i round of the first cryptographic operation and i−1 round of the second cryptographic operation are performed during at least one of the multiple stages.

In an embodiment, the arithmetic logic unit is configured so that the first cryptographic operation on the first block of input data is performed in parallel with the second cryptographic operation on the second block of input data such that a first round of the first cryptographic operation and none of the rounds of the second cryptographic operation are performed during a first stage of the multiple stages.

In an embodiment, the arithmetic logic unit is configured so that the first cryptographic operation on the first block of input data is performed in parallel with the second cryptographic operation on the second block of input data such that none of the rounds of the first cryptographic operation and the last round of the second cryptographic operation are performed during a final stage of the multiple stages.

In an embodiment, wherein the first and second blocks of input data are sixteen (16) bits.

In an embodiment, each of the first and second cryptographic operations includes ten (10) rounds.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1:
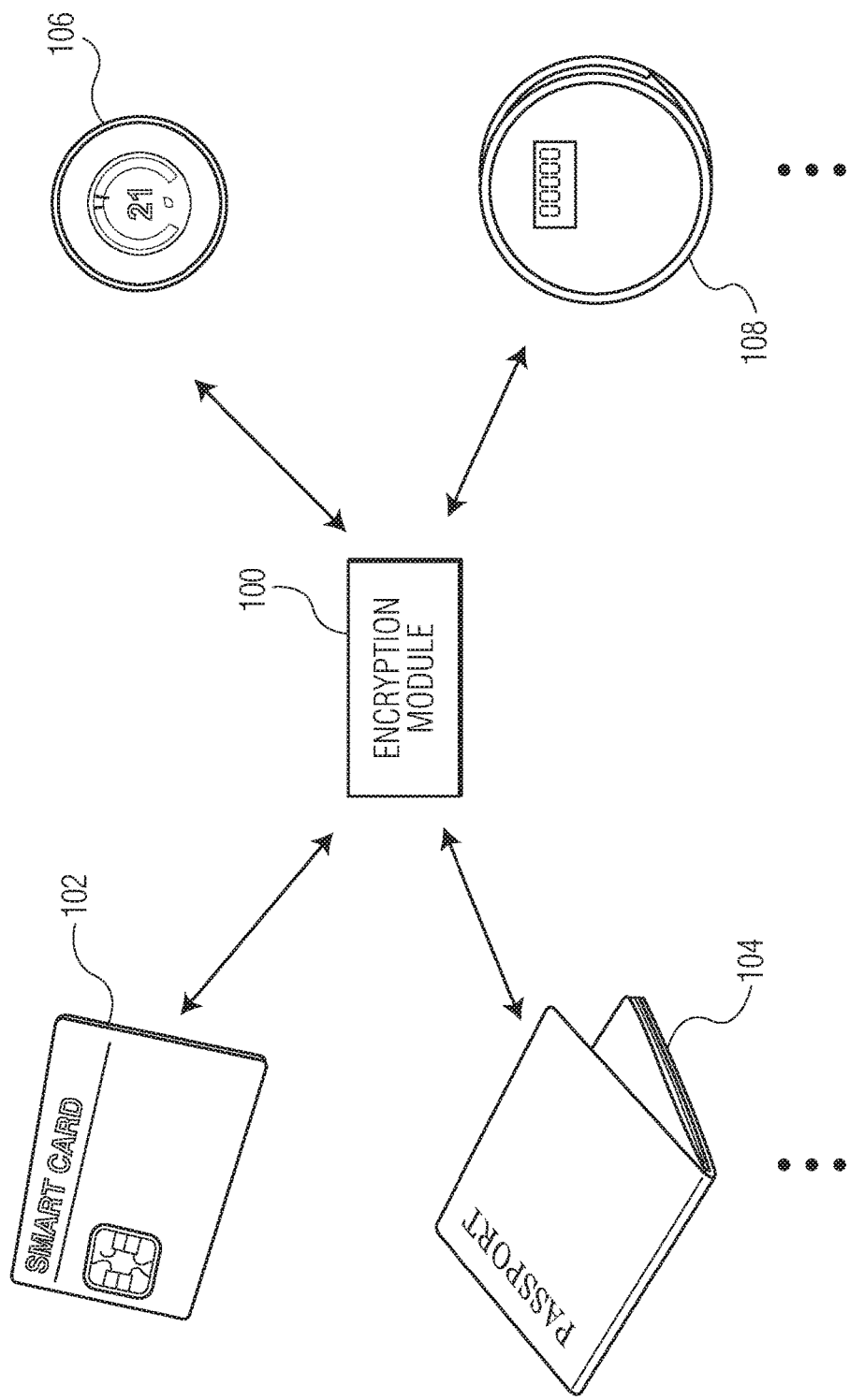
FIG. 1 is a block diagram of an encryption module that can be used in embedded systems in accordance with an embodiment of the invention.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

The "bit-slice" is a popular method to implement cryptographic algorithm. Its popularity is due to its capability to accelerate greatly the execution of software implementation on general purpose central processing units (CPUs). This method was introduced by Eli Biham in his paper titled "A Fast New DES Implementation in Software" (1997). This bit-sliced DES method computes the cipher on several blocks in parallel by simultaneous execution of n hardware logical gates, where n is a register size. Ciphers like DES can be efficiently implemented because the bit permutations are turned into register swaps or mere operation on pointers. The drawback however is that the latency to get the result from one block is typically slower and more memory is required due to the many blocks treated in parallel. For example, a bit-slice implementation of AES requiring 10,000 cycles to compute thirty two (32) blocks may achieve a low number of cycles per block (312 cycles/block). However, an application still needs to wait 10,000 cycles to get the result of a single block. In contrast, a T-box based implementation of AES can process a single block in 2,000 cycles. This is still a large number of cycles to process a single block, but is overall more useful since a lot of applications in embedded systems process a single block at a time (using cipher block chaining (CBC) mode for example).

Modern block ciphers like AES have a regular internal structure that have the following characteristics:
Add key is simply applied uniformly to the state
Sub-byte is uniform mapping of each byte of the state
Shift row does not change the value of the bytes; it just reorders them
Mix column is a uniform mapping of 4 bytes to 1 byte
Thus, it follows that AES and similar ciphers can be implemented in a "packed" bit-slice fashion with sixteen (16) bit registers. In this implementation, rather than computing sixteen (16) blocks in parallel, the bit slices are used to process the sixteen (16) bytes of the AES state in parallel. Such implementation has a latency of roughly sixteen (16) times lower than the classic bit-slice implementation, which would result in 625 cycles per block. If registers with thirty two (32) bits are available, then such implementation can compute two (2) blocks in parallel. However, the latency would still be 625 cycles but the throughput would reach 312 cycles/block.

Depending on the CPU and the cipher at hand, it is not always true that the "packed" bit-slice implementation is faster than other approaches. Even if it is not the fastest method, this approach has a significant advantage in the context of embedded systems since it can be combined with "masking", which is a well-known countermeasure against side channel attacks. A bit-slice implementation (packed or not) can be turned into a masked implementation by duplicating the internal state. Each share is processed independently when executing a linear operation like XOR or bit reordering, those operations therefore slow down by a factor of two (2). The processing of the non-linear operation such as AND is less straight forward, which typically incurs a slow down by a factor of seven (7) or eight (8). Despite the significant runtime overhead, the approach is interesting because it is applicable to any bit-slice implementation that follows a simple methodology and leads to a very good protection against side channel attacks.

Protecting embedded systems against side channel attacks is necessary but unfortunately, it is not enough. In most cases, protection against differential fault analysis (DFA) is also required.

Starting from a masked, packed, bit-slice implementation, the obvious solution is to process the same block twice in parallel and compare the final results, which are expected to be same for both processes. For example, two (2) AES operations can be computed in parallel on a CPU with 32 bit registers. Bit 0 to bit 15 can hold the bits for the first block and bits 16 to 31 can hold the bits for the second block. In this example, each AES operation consists of ten (10) rounds of processing, where each round may include one single-byte based substitution step, a row-wise permutation step, a column-wise mixing step and a round key addition step. This example is illustrated in the following table.

| Bit 0 to Bit 15: 1$^{st}$ AES state | Bit 16 to Bit 31: 2$^{nd}$ AES state |
|---|---|
| Round 1 | Round 1 |
| Round 2 | Round 2 |
| Round 3 | Round 3 |
| Round i | Round i |
| Round 10 | Round 10 |
| | Compare results |

In this approach, both operations are computed at the same time, and thus, the countermeasure has no runtime overhead. Unfortunately, such simple approach would be weak because the perturbation of an instruction would likely impact both operations in the same way. Thus, the final comparison would fail to detect any manipulation.

A better approach is to chain operations and compute two unrelated blocks in parallel. For example, in order to process three blocks A, B and C, block A is first processed through all the necessary rounds using bit 0 to bit 15 without any other block in bit 16 to bit 31. Then, blocks A and B are then processed in parallel. In particular, block B is processed using bit 0 to bit 15 and block A is processed using bit 16 to bit 31. The results of block A from the first process and block A from the second process are then compared to see if they are equivalent. Next, blocks B and C are then processed in parallel. In particular, block C is processed using bit 0 to bit 15 and block B is processed using bit 16 to bit 31. The results of block B from the previous process (when blocks A and B were processed in parallel) and block B from the subsequent process (when blocks B and C were processed in parallel) are then compared to see if they are equivalent. Next, block C is processed alone. In particular, block C is processed using bit 16 to bit 31 without any other block in bit 0 to bit 15. The results of block C from the previous process (when blocks B and C were processed in parallel) and block C from the subsequent process (when block C was processed alone) are then compared to see if they are equivalent. This example is illustrated in the following table.

| Bit 0 to Bit 15: | Bit 16 to Bit 31: |
|---|---|
| Block A (all rounds) | Not used |
| Block B | Block A |
| | Compare results of block A |
| Block C | Block B |
| | Compare results of block B |
| Not used | Block C |
| | Compare results of block C |

If there is a single block to process, block B can be replaced by a hardcoded test vector.

This approach is more robust than the obvious solution. However, the approach has the following drawbacks:

The runtime overhead is one block operation, which results in overhead approaching 100% for small number of blocks. For a single block, the runtime overhead is actually 200%!

The memory requirement is increased since three (3) blocks are "live" at the same time.

In the case where a single block must be computed, the whole process has only three (3) steps. If the same instruction is corrupted in these steps, the fault is not detected.

FIG. 1 shows an encryption module 100 in accordance with an embodiment that addresses some of the concerns described above with respect to security (e.g., DFA protection), runtime overhead and memory requirements. As illustrated in FIG. 1, the encryption module may be used in any smart card 102, electronic passport 104, internet of things (IoT) device 106 and smart meter 108. The encryption module may be implemented as software, hardware or any combination of software and hardware. As explained below, the encryption module provides protection of data, including differential fault analysis (DFA) attacks, without significantly adding runtime overhead or memory requirements.

Figure 2:
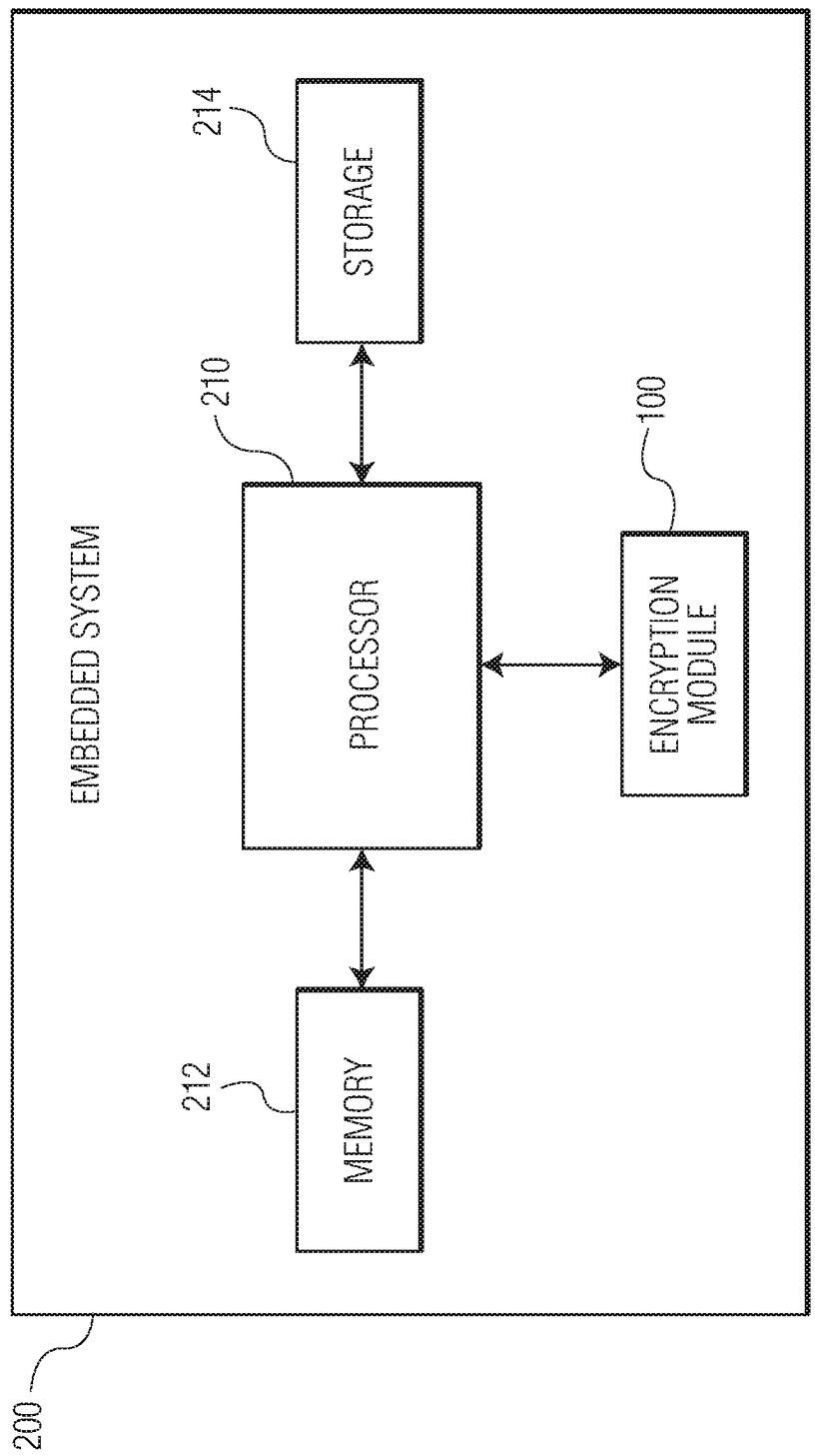
FIG. 2 is a block diagram of an embedded system with the encryption module in accordance with an embodiment of the invention.

Turning now to FIG. 2, an embedded system 200 with the encryption module 100 in accordance with an embodiment of the invention is shown. The embedded system includes a processor 210, memory 212, storage 214 and the encryption module 100. The processor 210 can be any processor found in embedded systems, such as a microcontroller or central processing unit (CPU). The memory 212 can be any type of volatile memory, such as random access memory. The storage 214 can be any type of computer data storage, such as a solid state memory. The embedded system may include other components that may be found in an embedded system. However, these other components are not shown or described herein so as to not obscure the inventive features of the embedded system.

The encryption module 100 operates to perform cryptographic operations for a desired process, which may be an encryption process or a decryption process. Each cryptographic operation includes multiple rounds, depending on the encryption/decryption process. As an example, the AES128 algorithm includes ten (10) rounds. Each round may include a number of different operations, such as a single-byte based substitution step, a row-wise permutation step, a column-wise mixing step and a round key addition step. The particular round operations and the order in which the round operations are performed depend on the encryption/decryption process.

In operation, using a key received from the processor 210, the encryption module 100 performs two cryptographic operations at the same time by the same instruction or the same finite state machine (FSM) state (for a hardware implementation), but with one operation being one round late with respect to the other operation. This operation will be explained using an example in which one-byte blocks are processed for cryptographic operations. The block for the first cryptographic operation is processed using bit 0 to bit 15, while the second block for the second cryptographic operation. In the first stage, round 1 of the first cryptographic operation is executed using bit 0 to bit 15 and no round of the cryptographic operation is executed. Thus, bit 16 to bit 31 are not used for the first stage. In the second stage, round 2 of the first cryptographic operation is executed using bit 0 to bit 15 and round 1 of the second cryptographic operation is executed using bit 15 to bit 31. In subsequent stages, round i of the first cryptographic operation is executed using bit 0 to bit 15 and round i-1 of the second cryptographic operation is executed using bit 15 to bit 31 until last round, i.e., round 10, of the first cryptographic operation has been completed. At the next and final stage, no round of the first cryptographic operation is executed and round 10 of the second cryptographic operation is executed using bit 15 to bit 31. Thus, in this stage, bit 0 to bit 15 are not used. This example is illustrated in the following table.

| Bit 0 to bit 15: 1$^{st}$ AES state | Bit 16 to bit 31: 2$^{nd}$ AES state |
|---|---|
| Round 1 | Not used |
| Round 2 | Round 1 |
| Round 3 | Round 2 |
| Round i | Round i-1 |
| Round 10 | Round 9 |
| Not used | Round 10 |

Using this technique, the runtime overhead is reduced to two (2) rounds of cryptographic operations. In addition, the robustness against faults on the execution flow is much stronger with only the following two cases not being detected.
1. The same instruction is corrupted during all stages.
2. A corruption of an instruction in a given stage results in equivalent faults in both AES states.

The first case is difficult to achieve but not impossible. However, no DFA method currently exists to exploit such a fault pattern. If judged necessary, this can be detected by processing a hard coded test vector in bit 0 to bit 15 during the last stage. The second case is rather unlikely and depends on the processed data, making the attack impractical in most cases.

The technique utilized by the encryption module 100 can be applied to other ciphers than AES and different key schedules. In addition, if the processor has sixteen (16) bits registers, the technique utilized by the encryption module can still be applicable. For such a processor, the encryption module processes each encryption state, such as AES state, in slices of eight (8) bits rather than sixteen (16), which will require twice as many operations. The comparison of registers used for a 32 bit CPU and a 16 bit CPU is illustrated in the following table for xor instruction of AES.

| 32 bit CPU | 16 bit CPU | Comment |
|---|---|---|
| xor r0, r1 | xor r0, r1<br>xor r2, r3 | One 8-bit segment of a xor on both AES state |

As described above, for the 32 bit CPU, register r0 (bit 0 to bit 15) is used for sixteen (16) bits of the first AES state and register r1 (bit 16 to bit 31) is used for the sixteen (16) bits of the second AES state. These two AES states are processed at the same time, but with the second AES state being one round late with respect to the other operation. For the 16 bit CPU, register r0 (bit 0 to bit 7) is used for eight (8) bits of the first AES state, register r1 (bit 8 to bit 15) is used for the eight (8) bits of the second AES state, register r2 (bit 0 to bit 7) is used for the other eight (8) bits of the first AES state, and register r3 (bit 8 to bit 15) is used for the other eight (8) bits of the second AES state. For the 16 bit processor, the registers must contain bits from both AES states. It may be tempting to rearrange the bits such that registers r0 and r1 contain sixteen (16) bits of one AES state and registers r2 and r3 contain the bits of the other AES state. However, this would fatally weaken the countermeasure because the first xor operation may be corrupted without any impact on the second operation.

The process for a 16 bit processor is similar to the process for a 32 bit processor in that there are eleven (11) stages, i.e., ten (10) rounds plus a "not used" round, where the rounds for the second AES state is one round late with respect to the rounds of the first AES state. In each round, the 1st 8-bit segment of the AES state and the second 8-bit segment of the same AES are both processed. Each of the rounds includes different operations that are performed in sequence. These operations would typically be "sub bytes", "shift rows", "mix columns" and "add key" operations. Each of these operations are subdivided in steps to implement the operations. These steps are instructions like logical AND, OR and XOR. For each of these steps, the 1st 8-bit segment of the AES state is performed first and then the 2nd 8-bit segment of the same AES state is performed. By processing the 1st 8-bit segment of the AES state and then the 2nd 8-bit segment of the same AES state for each step of each operation of each round, the 1st 8-bit segment and the 2nd 8-bit segment of the AES state are processed through all ten (10) rounds.

Figure 3:
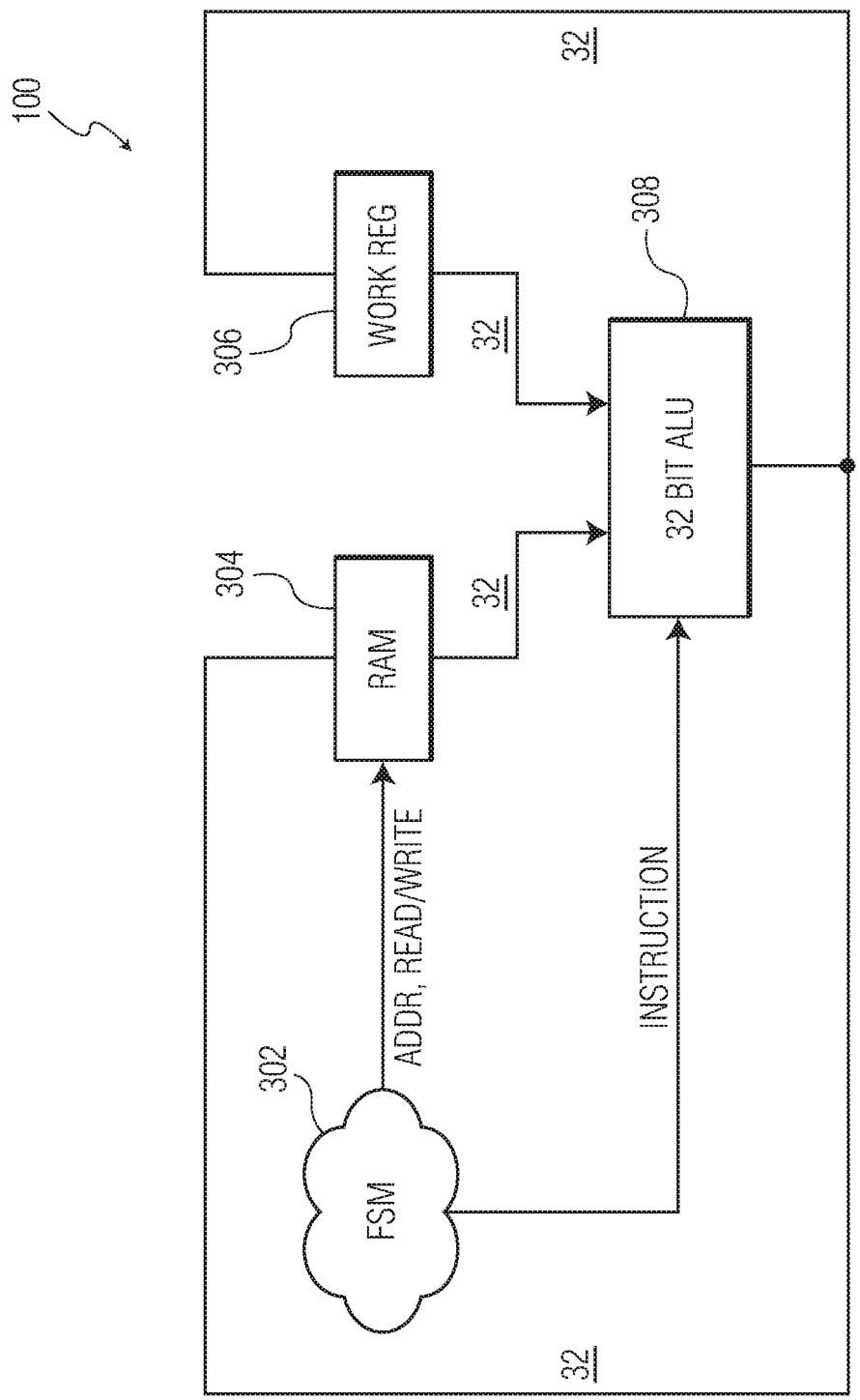
FIG. 3 is a block diagram of the encryption module implemented in hardware in accordance with an embodiment of the invention.

As mentioned above, the encryption module 100 may be implemented in hardware. An example of such implementation is illustrated in FIG. 3 in accordance with an embodiment of the invention. As shown in FIG. 3, the encryption module 100 includes a finite state machine (FSM) 302, random access memory (RAM) 304, a work register 306 and a 32 bit arithmetic logic unit (ALU) 308. The ALU 308 supports at least the following operations: AND, XOR, LOAD 0xFFFFFFFF, LOAD RANDOM and ROTATE. The structure of this encryption module is similar to a generic processing unit because the fault protection mechanism needs to process data twice as large as it needs. The only notable deviation from a generic processing unit is the lack of a path allowing data dependent decision by the FSM 302, which is not needed since the purpose is to emulate a hardware circuit gate by gate. This omission is a proof that the implementation is executing in constant time. In this hardware implementation, input and key are written to the RAM 304 by the processor 210 (not shown in FIG. 3). The two outputs from the ALU 308 are written to the RAM 304 by the FSM 302. The final consistency check of outputs is done by the processor 210.

Figure 4:
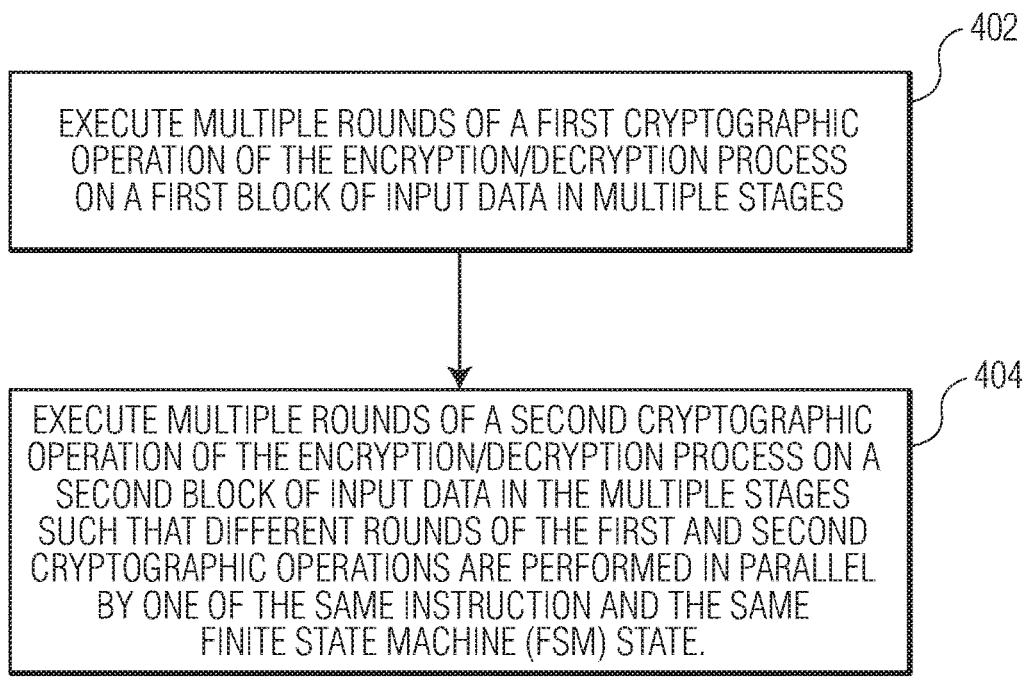
FIG. 4 is a process flow diagram of a method for performing an encryption/decryption process in accordance with an embodiment of the invention.

FIG. 4 is a process flow diagram of a method for performing an encryption/decryption process in accordance with an embodiment of the invention. At block 402, multiple rounds of a first cryptographic operation of the encryption/decryption process is executed on a first block of input data in multiple stages. At block 404, multiple rounds of a second cryptographic operation of the encryption/decryption process is executed on a second block of input data in the multiple stages, wherein the first cryptographic operation on the first block of input data is performed in parallel with the second cryptographic operation on the second block of input data such that different rounds of the first and second cryptographic operations are performed in parallel by one of the same instruction and the same finite state machine (FSM) state.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for performing an encryption/decryption process, the method comprising:
   executing multiple rounds of a first cryptographic operation of the encryption/decryption process on a first block of input data in multiple stages; and
   executing multiple rounds of a second cryptographic operation of the encryption/decryption process on a second block of input data in the multiple stages,
      wherein the first cryptographic operation on the first block of input data is performed in parallel with the second cryptographic operation on the second block of input data but with one of the first and second cryptographic operations being at least one round late with respect to the other operation such that different rounds of the first and second cryptographic operations are performed in parallel at a same time by one of a same instruction and a same finite state machine (FSM) state.

2. The method of claim 1, wherein the first cryptographic operation on the first block of input data is performed in parallel with the second cryptographic operation on the second block of input data such that i round of the first cryptographic operation and i−1 round of the second cryptographic operation are performed at a same time_during at least one of the multiple stages.

3. The method of claim 2, wherein the first cryptographic operation on the first block of input data is performed in parallel with the second cryptographic operation on the second block of input data such that a first round of the first cryptographic operation and none of the rounds of the second cryptographic operation are performed during a first stage of the multiple stages.

4. The method of claim 3, wherein the first cryptographic operation on the first block of input data is performed in parallel with the second cryptographic operation on the second block of input data such that none of the rounds of the first cryptographic operation and the last round of the second cryptographic operation are performed during a final stage of the multiple stages.

5. The method of claim 1, wherein the first and second blocks of input data are sixteen (16) bits.

6. The method of claim 1, wherein the first and second blocks of input data are eight (8) bits.

7. The method of claim 1, wherein each of the first and second cryptographic operations includes ten (10) rounds.

8. A non-transitory computer-readable storage medium containing program instructions for performing an encryption/decryption process, wherein execution of the program instructions by one or more processors of a computer system causes the one or more processors to perform steps comprising:
   executing multiple rounds of a first cryptographic operation of the encryption/decryption process on a first block of input data in multiple stages; and
   executing multiple rounds of a second cryptographic operation of the encryption/decryption process on a second block of input data in the multiple stages,
      wherein the first cryptographic operation on the first block of input data is performed in parallel with the second cryptographic operation on the second block of input data but with one of the first and second cryptographic operations being at least one round late with respect to the other operation such that different rounds of the first and second cryptographic operations are performed in parallel at a same time by one of a same instruction and a same finite state machine (FSM) state.

9. The computer-readable storage medium of claim 8, wherein the first cryptographic operation on the first block of input data is performed in parallel with the second cryptographic operation on the second block of input data such that i round of the first cryptographic operation and i−1 round of the second cryptographic operation are performed at a same time during at least one of the multiple stages.

10. The computer-readable storage medium of claim 9, wherein the first cryptographic operation on the first block of input data is performed in parallel with the second cryptographic operation on the second block of input data such that a first round of the first cryptographic operation and none of the rounds of the second cryptographic operation are performed during a first stage of the multiple stages.

11. The computer-readable storage medium of claim 10, wherein the first cryptographic operation on the first block of input data is performed in parallel with the second cryptographic operation on the second block of input data such that none of the rounds of the first cryptographic operation and the last round of the second cryptographic operation are performed during a final stage of the multiple stages.

12. The computer-readable storage medium of claim 8, wherein the first and second blocks of input data are sixteen (16) bits.

13. The computer-readable storage medium of claim 8, wherein the first and second blocks of input data are eight (8) bits.

14. The computer-readable storage medium of claim 8, wherein each of the first and second cryptographic operations includes ten (10) rounds.

15. An apparatus comprising: memory;
    a register;
    a finite state machine (FSM); and an arithmetic logic unit,
       wherein the arithmetic logic unit is configured to execute multiple rounds of a first cryptographic operation of the encryption/decryption process on a first block of input data in multiple stages and execute multiple rounds of a second cryptographic operation of the encryption/decryption process on a second block of input data in the multiple stages, and wherein the arithmetic logic unit is further configured so that the first cryptographic operation on the first block of input data is performed in parallel with the second cryptographic operation on the second block of input data but with one of the first and second cryptographic operations being at least one round late with respect to the other operation such that different rounds of the first and second cryptographic operations are performed in parallel at a same time by one of a same instruction and a same finite state machine (FSM) state.

16. The apparatus of claim 15, wherein the arithmetic logic unit is configured so that the first cryptographic operation on the first block of input data is performed in parallel with the second cryptographic operation on the second block of input data such that i round of the first cryptographic operation and i−1 round of the second cryptographic operation are performed at a same time during at least one of the multiple stages.

17. The apparatus of claim 16, wherein the arithmetic logic unit is configured so that the first cryptographic operation on the first block of input data is performed in parallel with the second cryptographic operation on the second block of input data such that a first round of the first cryptographic operation and none of the rounds of the second cryptographic operation are performed during a first stage of the multiple stages.

18. The apparatus of claim 17, wherein the arithmetic logic unit is configured so that the first cryptographic operation on the first block of input data is performed in parallel with the second cryptographic operation on the second block of input data such that none of the rounds of the first cryptographic operation and the last round of the second cryptographic operation are performed during a final stage of the multiple stages.

19. The apparatus of claim 17, wherein the first and second blocks of input data are sixteen (16) bits.

20. The apparatus of claim 17, wherein each of the first and second cryptographic operations includes ten (10) rounds.

* * * * *